US012785578B2

(12) United States Patent
Ren et al.

(10) Patent No.: US 12,785,578 B2
(45) Date of Patent: Nov. 3, 2026

(54) ACTIVE CLAMP FLYBACK CONVERTER AND CONTROL METHOD

(71) Applicant: Delta Electronics (Shanghai) CO., LTD., Shanghai (CN)

(72) Inventors: Liangliang Ren, Shanghai (CN); Wei Wang, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 172 days.

(21) Appl. No.: 18/936,903

(22) Filed: Nov. 4, 2024

(65) Prior Publication Data

US 2025/0158531 A1 May 15, 2025

(30) Foreign Application Priority Data

Nov. 14, 2023 (CN) ......................... 202311516794.2

(51) Int. Cl.
*H02M 3/335* (2006.01)
*H02M 1/00* (2006.01)
*H02M 1/34* (2007.01)
*H02M 3/00* (2006.01)

(52) U.S. Cl.
CPC ..... *H02M 3/33592* (2013.01); *H02M 1/0058* (2021.05); *H02M 3/01* (2021.05)

(58) Field of Classification Search
CPC ......... H02M 3/33569; H02M 3/33576; H02M 3/33592; H02M 3/01; H02M 1/342
See application file for complete search history.

(56) References Cited

U.S. PATENT DOCUMENTS

| | | | | |
|---|---|---|---|---|
| 11,336,190 B2 | | 5/2022 | Su et al. | |
| 2021/0167680 A1 | * | 6/2021 | Odell | H02M 3/33576 |

FOREIGN PATENT DOCUMENTS

| | | | | | |
|---|---|---|---|---|---|
| CN | 113346753 A | * | 9/2021 | H02M 1/14 |
| CN | 114793069 A | * | 7/2022 | H02H 7/1213 |
| CN | 115021521 A | | 9/2022 | |
| CN | 113410994 B | | 3/2023 | |
| CN | 115800762 A | * | 3/2023 | |
| TW | 202121813 A | * | 6/2021 | H02M 1/083 |
| TW | 202341623 A | * | 10/2023 | H02M 3/33569 |

* cited by examiner

*Primary Examiner* — Sisay G Tiku
(74) *Attorney, Agent, or Firm* — Qinghong Xu

(57) ABSTRACT

The present disclosure provides an active clamp flyback converter and a control method, and relates to the technical field of converter. The control method includes: in response to that an input voltage of the active clamp flyback converter is less than a preset voltage threshold, or the input voltage of the active clamp flyback converter is less than a product of an output voltage of the active clamp flyback converter and a turns ratio of the transformer, in a same switching cycle, controlling the clamp switch to turn on when the transformer is in a demagnetization stage; and controlling the clamp switch to turn off when a resonant current of the clamp capacitor and a leakage inductance of the transformer reaches a preset current threshold.

20 Claims, 11 Drawing Sheets

ACTIVE CLAMP FLYBACK CONVERTER AND CONTROL METHOD

CROSS REFERENCE

This application is based upon and claims priority to Chinese Patent Application No. 2023115167942, filed on Nov. 14, 2023, the entire contents thereof are incorporated herein by reference.

TECHNICAL FIELD

The present disclosure relates to the technical field of converter, and particularly, to an active clamp flyback converter and a control method.

BACKGROUND

Miniaturization as well as high power density have become the development trend of power adapters. In the actual working process, due to the existence of a leakage inductance of a flyback converter in the power adapter, the energy of the primary side circuit cannot be fully transferred to the secondary side circuit, resulting in loss. And the resonance between the leakage inductance of the primary side circuit and a junction capacitance of the switching transistor (such as a MOS transistor) of the primary side circuit causes the drain of the main switching transistor to generate a high frequency voltage spike. In the process of product design, in order to reduce the voltage stress of the main switching transistor, the common practice is to add an RCD absorption circuit as shown in FIG. 1, which dissipates the leakage inductance energy through a resistor Rp, resulting in the leakage inductance energy being wasted. An active clamp flyback (ACF) circuit can recover part of the leakage inductance energy. However, different ACF control methods have different recovery effects on the leakage inductance energy. Therefore, a better ACF control method is needed.

It should be noted that the information disclosed in the above background is only used to enhance an understanding of the background of the present disclosure, therefore it may include information that does not constitute the prior art known to those skilled in the art.

SUMMARY

The present disclosure provides an active clamp flyback converter and a control method, which at least to a certain extent improves the recovery effect of the leakage inductance energy, and improves the existing ACF control methods, which have a problem of poor recovery effect of leakage inductance energy.

Other features and advantages of the present disclosure will become apparent through the following detailed description, or, may be learned partially by practice of the present disclosure.

According to an aspect of the present disclosure, a control method for an active clamp flyback converter is provided, and the active clamp flyback converter includes:

a transformer, including a primary side winding and a secondary side winding coupled with each other;

a primary side switch, connected in series to the primary side winding;

a clamp branch circuit, connected in parallel to the primary side winding or in parallel to the primary side switch; where the clamp branch circuit includes a clamp switch and a clamp capacitor connected in series;

the control method includes:

in response to that an input voltage of the active clamp flyback converter is less than a preset voltage threshold, or the input voltage of the active clamp flyback converter is less than a product of an output voltage of the active clamp flyback converter and a turns ratio of the transformer, performing following steps:

in a same switching cycle, controlling the clamp switch to turn on when the transformer is in a demagnetization stage; and controlling the clamp switch to turn off when a resonant current of the clamp capacitor and a leakage inductance of the transformer reaches a preset current threshold.

In an embodiment of the present disclosure, the active clamp flyback converter further includes a secondary side circuit, the secondary side circuit is electrically connected to the secondary side winding, where the control method includes: in response to that the input voltage of the active clamp flyback converter is greater than or equal to the preset voltage threshold, and the input voltage of the active clamp flyback converter is greater than the product of the output voltage of the active clamp flyback converter and the turns ratio of the transformer, performing following steps:

in a same switching cycle, controlling the clamp switch to turn on after an end of a freewheeling stage of the secondary side circuit; and, controlling the clamp switch to turn off before the primary side switch is turned on.

In an embodiment of the present disclosure, the control method further includes: in response to that the input voltage of the active clamp flyback converter is greater than or equal to the preset voltage threshold, and the input voltage of the active clamp flyback converter is greater than the product of the output voltage of the active clamp flyback converter and the turns ratio of the transformer, performing following steps:

in a same switching cycle, controlling the clamp switch to turn on when the transformer is in the demagnetization stage; and controlling the clamp switch to turn off when the resonant current of the clamp capacitor and the leakage inductance of the transformer reaches the preset current threshold.

In an embodiment of the present disclosure, controlling the clamp switch to turn on after the end of the freewheeling stage of the secondary side circuit, includes:

controlling the clamp switch to turn on when a voltage across the primary side switch oscillates to a peak value after the end of the freewheeling stage of the secondary side circuit.

In an embodiment of the present disclosure, controlling the clamp switch to turn off before the primary side switch is turned on, includes:

determining a conduction duration according to the input voltage of the active clamp flyback converter, the output voltage of the active clamp flyback converter, an equivalent capacitance of the primary side switch, and a magnetic inductance of the transformer; and controlling the clamp switch to turn off when a turn-on duration of the clamp switch reaches the conduction duration before the primary side switch is turned on.

In an embodiment of the present disclosure, controlling the clamp switch to turn on after the end of the freewheeling stage of the secondary side circuit comprises: when the primary side switch is turned off and a current flowing through the secondary side winding is a positive current, the secondary side circuit is in the freewheeling stage.

In an embodiment of the present disclosure, the control method further includes: determining whether the transformer is in the demagnetization stage according to a current flowing through a magnetic inductance of the primary side winding.

In an embodiment of the present disclosure, determining whether the transformer is in the demagnetization stage according to the current flowing through the magnetic inductance of the primary side winding, includes:

the transformer being in the demagnetization stage when the current flowing through the magnetic inductance of the primary side winding is a positive current and presents a downward trend.

In an embodiment of the present disclosure, in response to that the input voltage of the active clamp flyback converter is less than the preset voltage threshold, or the input voltage of the active clamp flyback converter is less than the product of the output voltage of the active clamp flyback converter and the turns ratio of the transformer, the active clamp flyback converter operates in a single pulse non-complementary mode.

In an embodiment of the present disclosure, the preset current threshold is 0 A.

In an embodiment of the present disclosure, in response to that the input voltage of the active clamp flyback converter is less than the product of the output voltage of the active clamp flyback converter and the turns ratio of the transformer, a voltage across the primary side switch oscillates to 0V; in response to that the input voltage of the active clamp flyback converter is greater than or equal to the product of the output voltage of the active clamp flyback converter and the turns ratio of the transformer, the voltage across the primary side switch is unable to oscillate to 0V.

In an embodiment of the present disclosure, the active clamp flyback converter further includes a secondary side circuit, and the secondary side circuit includes an output capacitor;

the control method further includes:

in a stage where the primary side switch is turned off and the clamp switch is turned on, the clamp capacitor transmitting energy to at least one of the output capacitor or an output load via the clamp switch.

According to another aspect of the present disclosure, an active clamp flyback converter is provided, and the active clamp flyback converter includes:

a transformer, including a primary side winding and a secondary side winding coupled with each other;

a primary side switch, connected in series to the primary side winding;

a clamp branch circuit, connected in parallel to the primary side winding or in parallel to the primary side switch; where the clamp branch circuit includes a clamp switch and a clamp capacitor connected in series;

a control unit, connected to the primary side switch and the clamp switch, where the control unit is configured to: in response to that an input voltage of the active clamp flyback converter is less than a preset voltage threshold, or the input voltage of the active clamp flyback converter is less than a product of an output voltage of the active clamp flyback converter and a turns ratio of the transformer, in a same switching cycle, control the clamp switch to turn on when the transformer is in a demagnetization stage; and control the clamp switch to turn off when a resonant current of the clamp capacitor and a leakage inductance of the transformer reaches a preset current threshold.

In the active clamp flyback converter and the control method provided by the embodiments of the present disclosure, in response to that the input voltage of the active clamp flyback converter is less than the preset voltage threshold, or the input voltage of the active clamp flyback converter is less than the product of the output voltage of the active clamp flyback converter and the turns ratio of the transformer, in the same switching cycle, the clamp switch is controlled to be turned on when the transformer is in the demagnetization stage, so that a core loss and a rectification loss at the secondary diode caused by a negative exciting current can be reduced. The clamp switch is controlled to be turned off when the resonant current of the clamp capacitor and the leakage inductance of the transformer reaches a preset current threshold, so that a turn-off loss of the clamp switch and the oscillation loss of the clamp capacitor and the leakage inductance of the transformer can be reduced.

It should be understood that the foregoing general description and the following detailed description are exemplary and explanatory only, and do not limit the present disclosure.

BRIEF DESCRIPTION OF THE DRAWINGS

The accompanying drawings herein, which are incorporated in and constitute a part of this specification, illustrate embodiments consistent with the present disclosure and are used in conjunction with the specification to explain the principles of the present disclosure.

Obviously, the drawings in the following description are only some embodiments of the present disclosure. For those of ordinary skill in the art, other drawings can also be obtained from these drawings without paying creative effort.

DETAILED DESCRIPTION

Exemplary embodiments will now be described more fully with reference to the accompanying drawings.

It should be noted that exemplary embodiments may be embodied in various forms and should not be construed as limited to the examples set forth herein.

In the embodiments of the present disclosure, the terms "first", "second" and "third" are used for description purposes only and shall not be understood as indicating or implying relative importance.

The term "and/or" in the present disclosure is merely a description of an association relationship of the associated objects, indicating that three kinds of relationships may exist, for example, A and/or B may mean: A exists alone, A and B exist simultaneously, and B exists alone. In addition, the character "/" in the present disclosure generally indicates that the associated objects before and after are in an "or" relationship.

The active clamp flyback converter can realize recovery of leakage inductance energy and Zero Voltage Switch (ZVS) of the main switch, and further improve product efficiency and power density. Active clamps are divided into complementary active clamps and non-complementary active clamps, where the non-complementary active clamps are favored for their high efficiency at light loads and at full loads with high voltage inputs.

Figure 5:
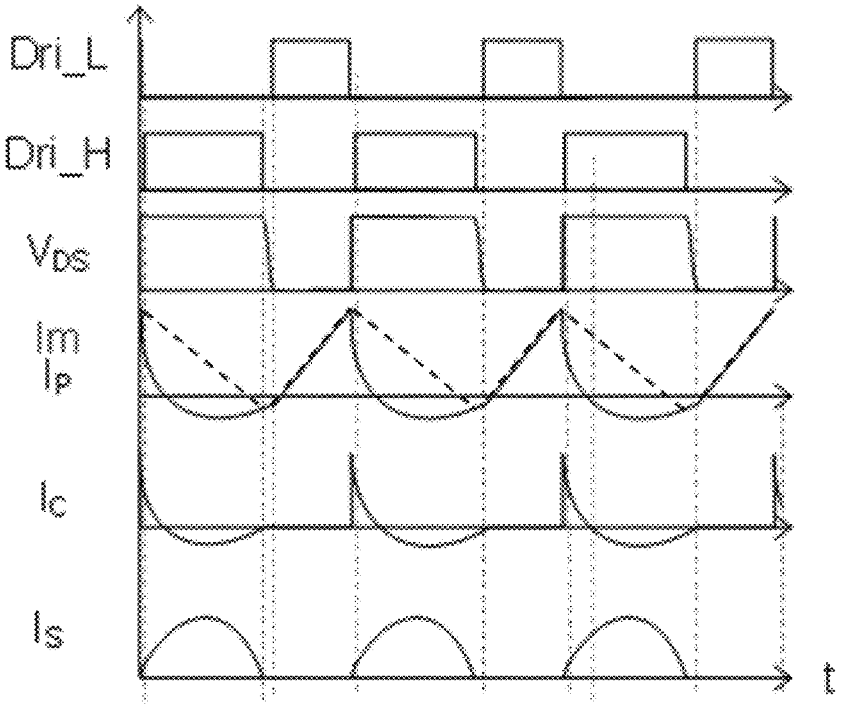
FIG.5 (Prior art)
FIG. 5 shows a typical operating waveform of a conventional complementary-controlled active clamp.

FIG. 5 shows a typical operating waveform of a conventional complementary-controlled active clamp flyback converter. Taking the schematic diagram of the circuit shown in FIG. 3 as an example, in FIG. 5, Dri_L is used to represent an operating waveform of a primary side switch L_S, Dri_H is used to represent an operating waveform of a clamp switch H_S, $V_{DS}$ is used to represent a voltage between the drain and source of the primary side switch L_S, $I_P$ is used to represent an input current of a transformer, Iç is used to represent a current of a clamp branch circuit, $I_S$ is used to represent a current of a secondary side, and $I_m$ is used to represent an exciting current. As shown in FIG. 5, the primary side switch L_S and the active clamp switch H_S operate in a complementary manner. Specifically, within a switching cycle, when the primary side switch L_S is turned off, the clamp switch H_S is turned on; and when the primary side switch L_S is turned on, the clamp switch H_S is turned off. There may be a small dead time between the two to prevent the primary side switch L_S from being turned on when the clamp switch H_S is not completely turned off, which leads to a direct connection between the two, thereby causing damage to the active clamp flyback converter.

The difference between the non-complementary active clamp and the above complementary active clamp described above is that the control of the primary side switch L_S and the clamp switch H_S in the non-complementary active clamp flyback converter is not complementary during one switching cycle. The clamp switch H_S is controlled, for example, as being briefly turned on before the primary side switch L_S is turned on.

Figure 6:
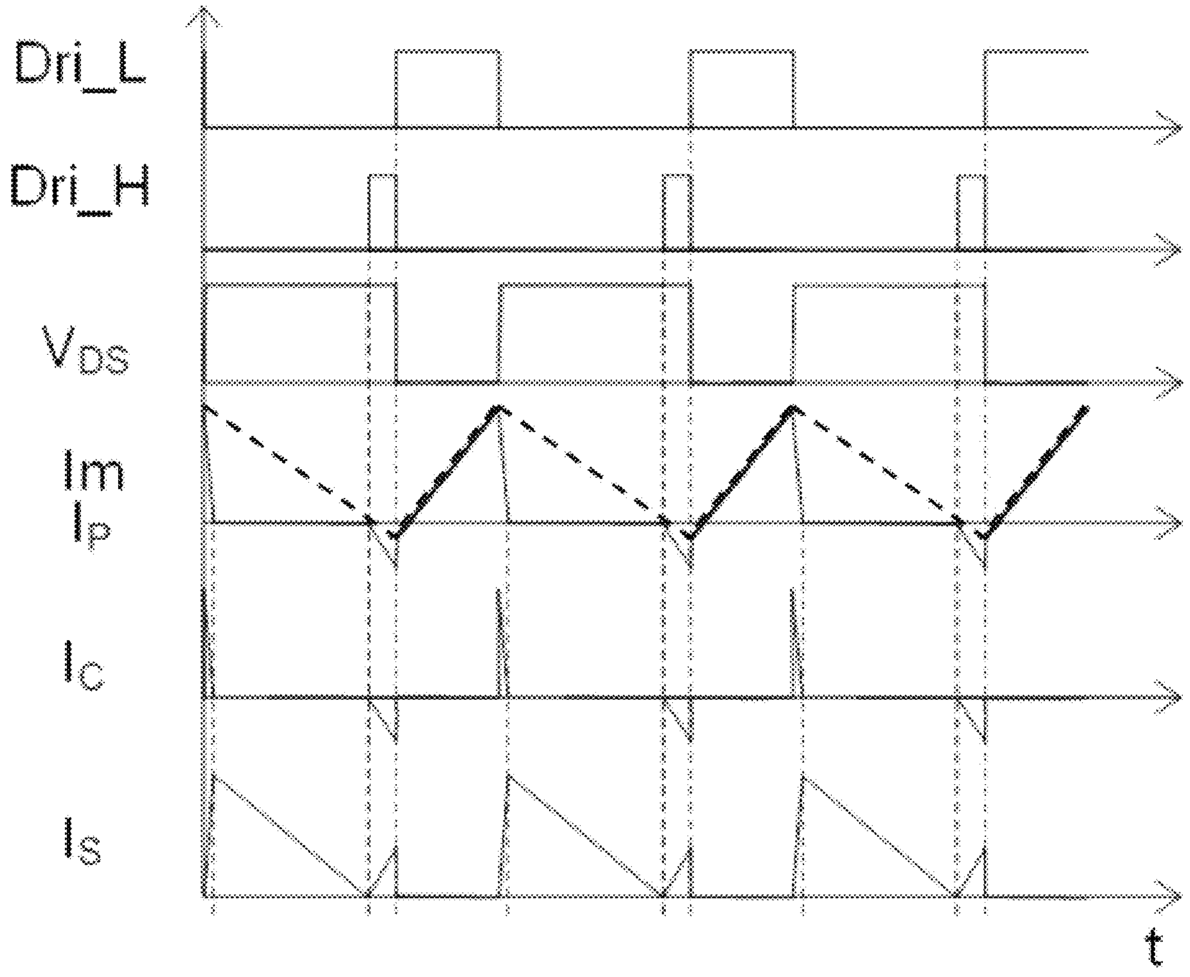
FIG.6 (Prior art)
FIG. 6 shows a waveform of a conventional non-complementary active clamp operating at a low voltage with a heavy load.

A conventional control method for a non-complementary active clamp flyback converter includes, for example, that the active clamp flyback converter operates in a critical continuous mode when a low voltage is input and the load is heavy, and a waveform thereof may be shown in FIG. 6, where the exciting current $I_m$ is represented by a dashed line. The clamp switch H_S is turned on as soon as a freewheeling stage of the secondary side circuit ends, which brings additional core loss. In addition, since a conduction time of the clamp switch H_S decreases as the input voltage $V_{in}$ decreases, the resonant current is relatively large when the clamp switch H_S is turned off under low-voltage input conditions, resulting in a relatively large turn-off loss, and the energy of the leakage inductance $L_k$ will be wasted.

The recovery efficiency of the leakage inductance of the above situation where the voltage is low and the load is heavy in practical implementation is not ideal, and the inventor(s) has found that the reason for the unsatisfactory recovery efficiency is mainly that the additional core loss is brought out by immediately turning on the clamp switch H_S after the end of the freewheeling stage, and a hard shutdown of the clamp switch H_S also causes a loss.

In order to solve the above problem, embodiments of the present disclosure provide an active clamp flyback converter, and a control unit is configured to execute a control method for the active clamp flyback converter provided by an embodiment of the present disclosure. The control method for the active clamp flyback converter provided by the present disclosure can further improve the recovery efficiency of the leakage inductance of the non-complementary active clamp by optimizing the conduction time of the primary side switch L_S and the clamp switch H_S.

Figure 2:
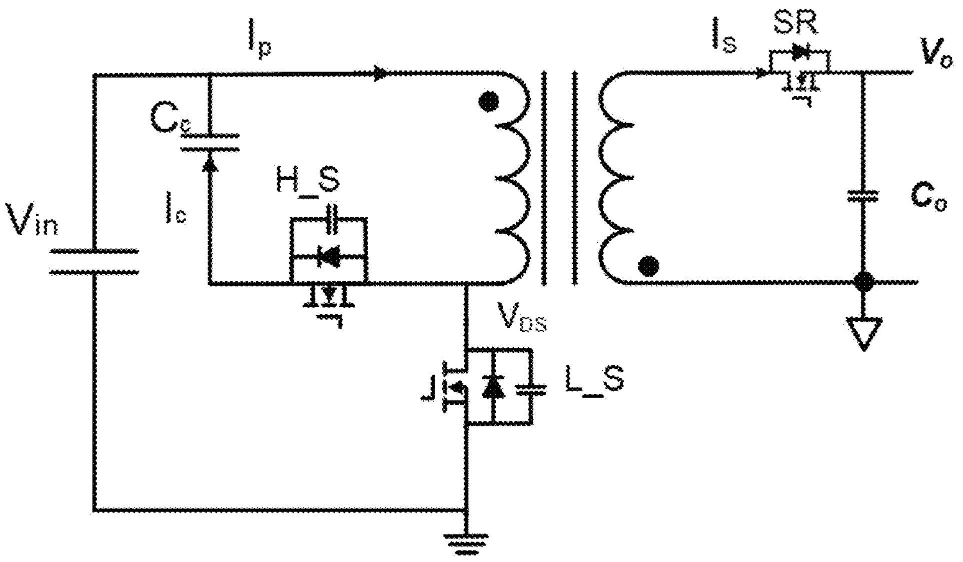
FIG. 2 shows a schematic diagram of a circuit of an active clamp flyback converter in an embodiment of the present disclosure.
Figure 3:
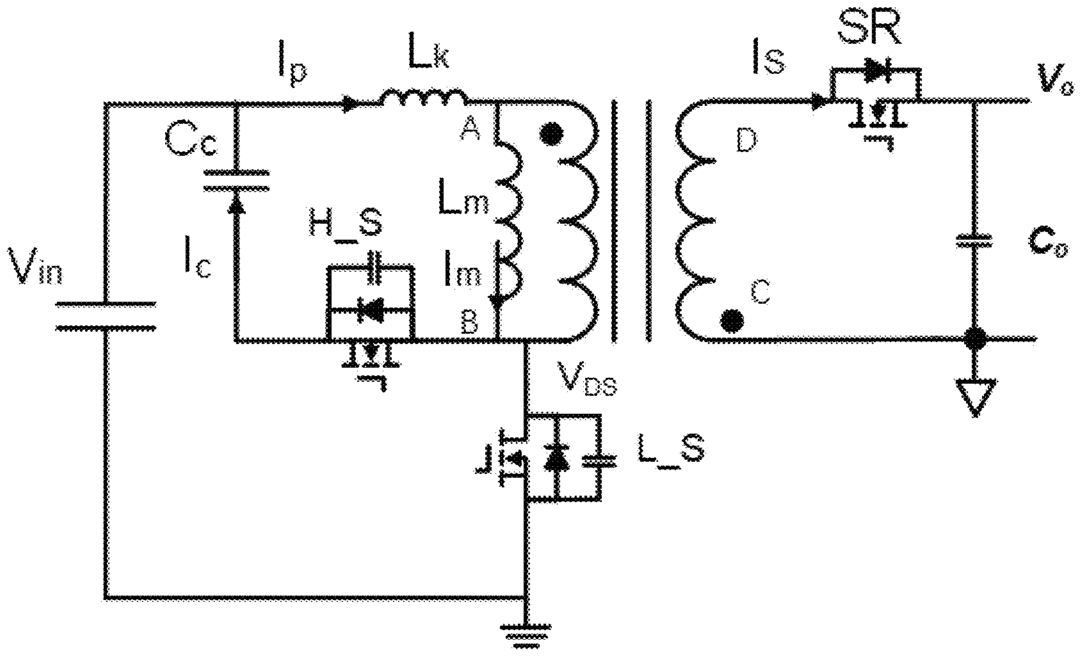
FIG. 3 shows a schematic diagram of a specific circuit of the active clamp flyback converter in FIG. 2.
Figure 4:
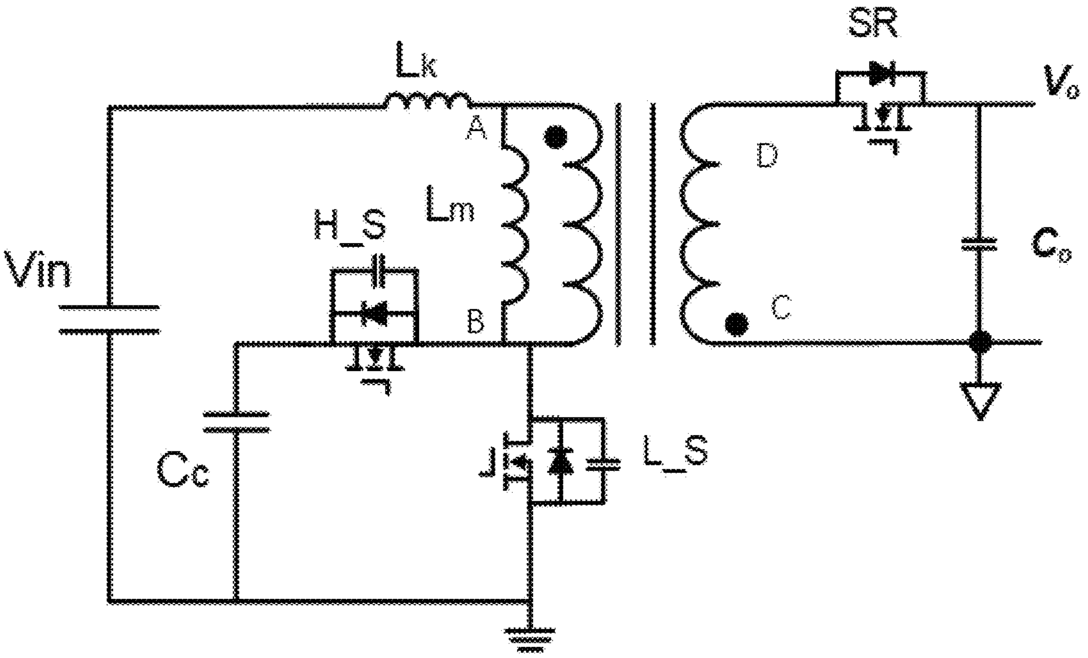
FIG. 4 shows a schematic diagram of a circuit of another active clamp flyback converter in an embodiment of the present disclosure.

As shown in FIG. 2 to FIG. 4, embodiments of the present disclosure provide an active clamp flyback converter, and the active clamp flyback converter includes a transformer, a primary side switch L_S and a clamp branch circuit; where the transformer includes a primary side winding and a secondary side winding coupled with each other; the primary side switch L_S is connected in series to the primary side winding; the clamp branch circuit is connected in parallel to the primary side winding or in parallel to the primary side switch L_S, and the clamp branch circuit includes a clamp switch H_S and a clamp capacitor $C_C$ connected in series.

Figure 1:
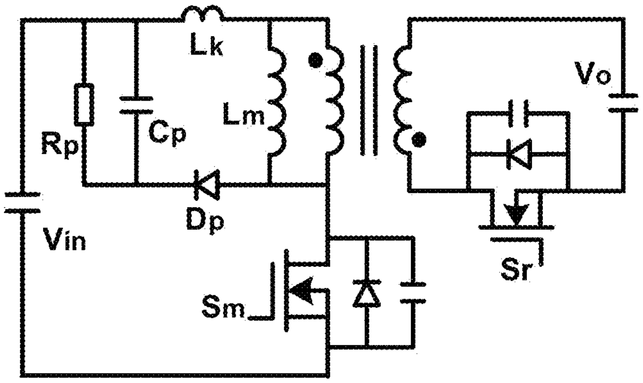
FIG.1 (Prior art)
FIG. 1 shows a schematic diagram of a circuit of a conventional RCD clamp flyback converter.

Unlike the dissipation of the leakage inductance energy through the resistor $R_p$ as shown in FIG. 1 above, the active clamp flyback converter provided by the embodiments of the present disclosure can realize the recovery of the leakage inductance energy by controlling the on and off of the clamping switch H_S to transfer the leakage inductance energy to an output terminal of the active clamp flyback converter.

FIG. 2 shows a circuit of an active clamp flyback converter provided by an embodiment of the present disclosure, where the clamp branch circuit is connected in parallel to the primary side winding, and the clamp branch circuit includes the clamp switch H_S and the clamp capacitor $C_C$ connected in series.

FIG. 3 shows a specific circuit of the active clamp flyback converter in FIG. 2. The active clamp flyback converter specifically shows a leakage inductance $L_k$ and a magnetic inductance $L_m$ of the transformer, and a secondary side circuit is also shown in the circuit. The secondary side circuit is electrically connected to the secondary side winding, and is used to convert the energy transferred by the secondary side winding and output it to the load as an output voltage $V_o$.

FIG. 4 shows a circuit of another active clamp flyback converter provided by an embodiment of the present disclosure, which is similar to the active clamp flyback converter shown in FIG. 3, with the difference that the clamp branch circuit is connected in parallel to the primary side switch L_S.

It should be noted that FIGS. 2, 3, and 4 only illustrate the basic components of the active clamp flyback converter, and the active clamp flyback converter provided by the embodiments of the present disclosure may further include other component(s) according to practical needs.

Figure 7:
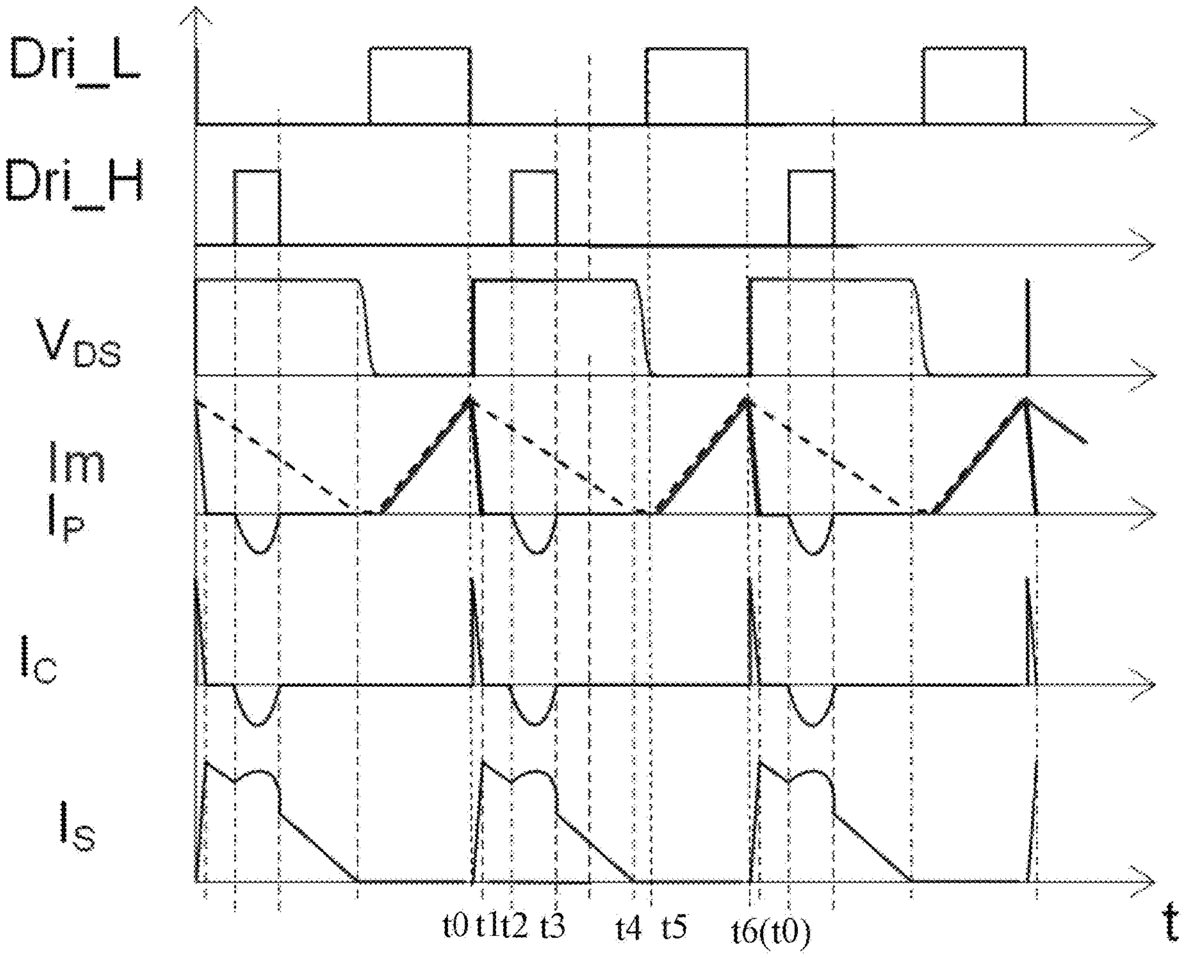
FIG. 7 shows an operating waveform of an active clamp flyback converter in an embodiment of the present disclosure.
Figure 8:
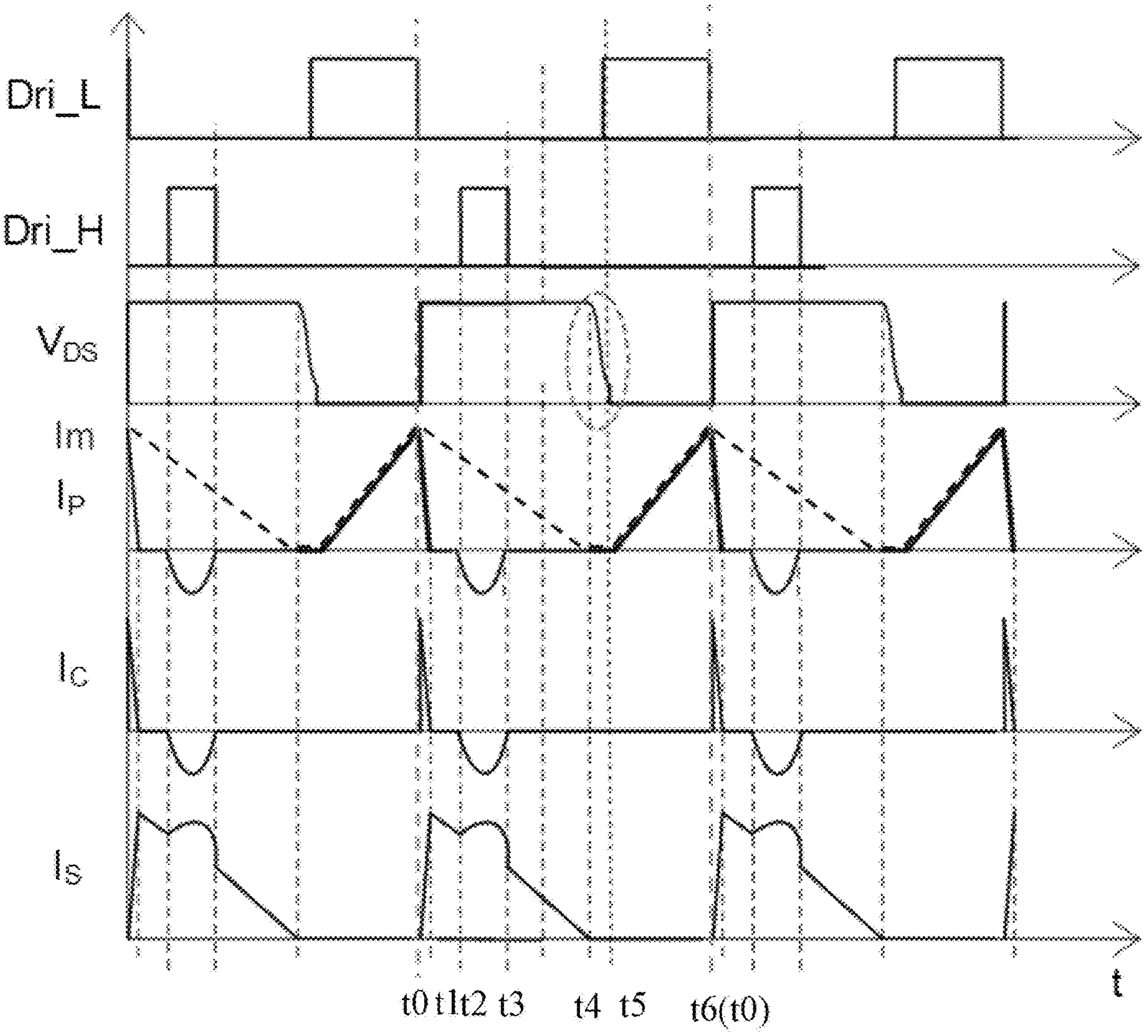
FIG. 8 shows an operating waveform of another active clamp flyback converter in an embodiment of the present disclosure.
Figure 9:
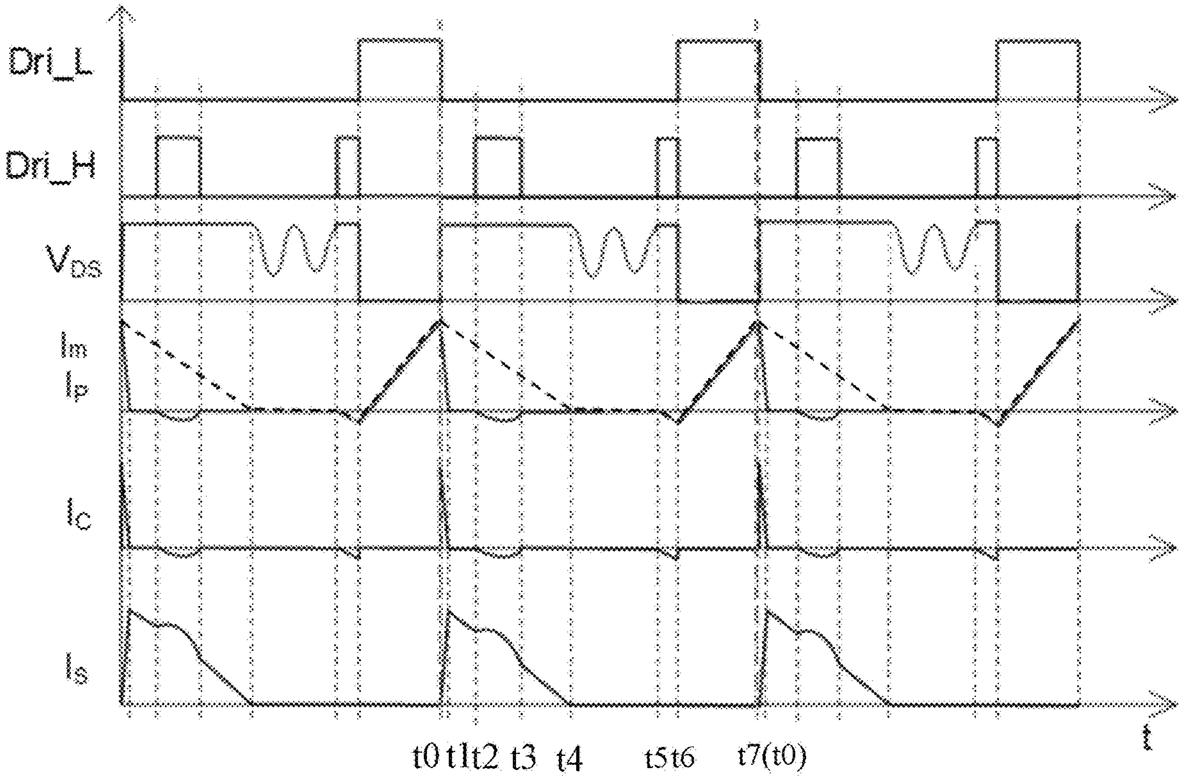
FIG. 9 shows an operating waveform of yet another active clamp flyback converter in an embodiment of the present disclosure.

For the active clamp flyback converters shown in FIG. 2 to FIG. 4, the secondary side circuit may further include an output capacitor $C_o$; the output capacitor $C_o$ may be used for filtering or for storing a portion of the energy of the clamp capacitor $C_C$ transferred via the clamp switch H_S during a stage in which the primary side switch L_S is turned off and the clamp switch H_S is turned on, such as the third stage t2 to t3 in FIG. 7 to FIG. 9.

For the active clamp flyback converters shown in FIG. 2 to FIG. 4, the secondary side circuit may also be provided with a secondary side switch SR. It should be noted that the control method for the active clamp flyback converter provided by the embodiments of the present disclosure does not discuss the control process of the secondary side switch SR for the time being. Unless otherwise specified, the secondary switch SR is in an on state.

For the active clamp flyback converters shown in FIG. 2 to FIG. 4, the active clamp flyback converter may further include a control unit (not shown in the drawings). The control unit is connected to the primary side switch L_S and the clamp switch H_S, and is used to control the on and off of the primary side switch L_S and the on and off of the clamp switch H_S. The primary side switch L_S and the clamp switch H_S may be MOS transistors, and the control unit may control the on and off of the primary switch L_S and the on and off of the clamp switch H_S through pulse signals.

The control method for the active clamp flyback converter provided by the embodiment of the present disclosure is introduced in detail below.

The control method for the active clamp flyback converter provided by the embodiment of the present disclosure may be applied to the active clamp flyback converter shown in FIG. 2, FIG. 3 or FIG. 4.

It should be noted that the execution body of the control method for the active clamp flyback converter may be the control unit in the above embodiment.

In some embodiments, the control method for the active clamp flyback converter provided by the embodiment of the present disclosure includes: when an input voltage $V_{in}$ of the active clamp flyback converter is less than a preset voltage threshold, or the input voltage $V_{in}$ of the active clamp flyback converter is less than a product of an output voltage $V_o$ of the active clamp flyback converter and a turns ratio n of the transformer, performing the following steps: in a same switching cycle, controlling the clamp switch H_S to turn on when the transformer is in a demagnetization stage; and controlling the clamp switch H_S to turn off when a resonant current of the clamp capacitor $C_C$ and a leakage inductance of the transformer $L_k$ reaches a preset current threshold.

In the above embodiment, the preset voltage threshold may be used to distinguish whether the input voltage $V_{in}$ is a high voltage or a low voltage. To simplify the description, in the following, the input voltage is said to be a low voltage when the input voltage $V_{in}$ is less than the preset voltage threshold, and the input voltage is said to be a high voltage when the input voltage $V_{in}$ is greater than or equal to the preset voltage threshold. In some embodiments, the preset voltage threshold is, for example, 140 VAC.

The control unit may obtain the input voltage $V_{in}$ and the output voltage $V_o$, and then determine whether the input voltage $V_{in}$ is the low voltage according to the input voltage $V_{in}$ and the preset voltage threshold. If the input voltage $V_{in}$ is the low voltage, or $V_{in}$<n*$V_o$, the above control scheme is executed. That is, in a same switching cycle, the clamp switch H_S is controlled to be turned on when the transformer is in a demagnetization stage; and the clamp switch H_S is controlled to be turned off when a resonant current of the clamp capacitor $C_C$ and a leakage inductance $L_k$ of the transformer reaches a preset current threshold. When $V_{in}$<n*$V_o$, the voltage across the primary side switch L_S may naturally oscillate to 0V. For example, when the primary side switch L_S is a MOS transistor, the voltage $V_{DS}$ between its drain and source may naturally oscillate to 0V.

Whether the transformer is in the demagnetization stage is related to the current flowing through the transformer, and the control unit may determine whether the transformer is in the demagnetization stage based on the changes in the current flowing through the transformer.

In some embodiments, the demagnetization stage may be determined according to a current flowing through the magnetic inductance $L_m$ of the primary side winding ($I_m$ as shown in FIGS. 7-9). That is to say, the above control method may further include determining whether the transformer is in the demagnetization stage according to the current $I_m$ flowing through the magnetic inductance $L_m$ of the primary side winding.

Specifically, in some embodiments, determining whether the transformer is in the demagnetization stage according to the current $I_m$ flowing through the magnetic inductance $L_m$ of the primary side winding may be that the transformer is in the demagnetization stage when the current $I_m$ flowing through the magnetic inductance $L_m$ of the primary side winding is a positive current and presents a downward trend (t0~t4 as shown in FIG. 7 to FIG. 9), where it is defined that the current $I_m$ is a positive current when it is flowing from an upper end A to a lower end B of the magnetic inductance $L_m$. For details on the specific period of the demagnetization stage, reference is made to the description of the operating waveform diagram of the active clamp flyback converter below.

In some embodiments, when an input voltage $V_{in}$ of the active clamp flyback converter is less than a preset voltage threshold, or the input voltage $V_{in}$ of the active clamp flyback converter is less than a product of an output voltage $V_o$ of the active clamp flyback converter and a turns ratio n of the transformer, the active clamp flyback converter operates in a single-pulse non-complementary mode. That is to say, when the input voltage is a low voltage, or when $V_{in}$<n*$V_o$, the control unit controls the clamp switch H_S to turn on only once in a same switching cycle based on the above control method, reference may be made to the operating waveform Dri_H of the clamp switch H_S as shown in FIG. 7 and FIG. 8.

In some embodiments, the preset current threshold may be a value close to 0. As an example, the preset current threshold may range from 0-0.2 A. As another example, the preset current threshold may be 0 A. When the preset current threshold is 0 A, when the resonant current of the clamp capacitor $C_C$ and the leakage inductance Lx of the transformer is at 0 A, the control unit turns off the clamp switch H_S, so that the recovery efficiency of the leakage inductance can be improved, and the turn-off loss of the clamp switch H_S as well as the oscillation loss of the leakage inductance can be reduced.

The operating waveform of the active clamp flyback converter when $V_{in}$<n*$V_o$ is illustrated below in conjunction with FIGS. 2-4 and FIG. 7. In this case, the input voltage $V_{in}$ may be less than the preset voltage threshold, and the input voltage $V_{in}$ may also be greater than or equal to the preset voltage threshold, that is, the input voltage may be either a low voltage or a high voltage.

First stage t0~t1: at the moment to, the primary switch L_S is turned off, a primary side current $I_p$ charges an output capacitor (i.e., the junction capacitance) of the primary side switch L_S, and an output capacitor (i.e., the junction capacitance) of the clamp switch H_S is discharged. When the voltage $V_{DS}$ across the drain and source of the primary side switch L_S rises to the input voltage $V_{in}$ plus a voltage of the clamp capacitor $C_C$, the clamp switch H_S is turned on, $V_{DS}$ is clamped, the leakage inductance $L_k$ charges the clamp capacitor $C_C$, and the energy of the leakage inductance $L_k$ is stored in the clamp capacitor $C_C$. The primary side current $I_p$ drops rapidly. At the moment t1, the primary side current $I_p$ drops to 0, and a secondary side current $I_s$ reaches a maximum value.

Second stage t1-t2: From the moment t1, the secondary side current $I_s$ begins to decrease and transmits energy to a load at the output terminal. At the moment t2 in the demagnetization stage, the clamp switch H_S is turned on.

Third stage t2~t3: At the moment t2, the clamp switch H_S is turned on, the voltage across the primary side magnetizing inductor $L_m$ is clamped by an output of the secondary side circuit, the clamp capacitor $C_C$ and the leakage inductance $L_k$ of the transformer start to resonate, and the energy of the clamp capacitor $C_C$ begins to be transferred to the secondary side circuit. After half a resonant cycle, the resonant current reaches 0 A at the moment t3, at which time the clamp switch H_S is controlled to be turned off. At this time, the recovery of the energy of the leakage inductance $L_k$ is realized, the turn-off loss is small at this time, and the leakage inductance $L_k$ will not generate oscillation, thereby reducing the leakage inductance loss. It should be noted that the clamp switch H_S may be turned on at any time during the demagnetization stage.

Fourth stage t3~t4: At this time, the secondary side winding continues to demagnetize until the secondary side current $I_s$ drops to 0 at moment t4.

Fifth stage t4~t5: From the moment t4, the primary side magnetic inductance $L_m$ starts to resonate with the junction capacitances of the primary side switch L_S, the clamp switch H_S and the secondary side switch transistor SR. $V_{DS}$ starts to oscillate from $V_{in}$+n*$V_o$, and the amplitude of the oscillation is n*$V_o$. Since in this embodiment $V_{in}$<n*$V_o$, $V_{DS}$ oscillates to 0V at the moment t5. At this time, the primary side switch L_S is turned on to realize a ZVS turn-on.

Sixth stage t5~t6 (t0): At the moment t5, the primary switch L_S is turned on, the voltage at the primary side of the transformer is $V_{in}$, the exciting current $I_m$ of the transformer and the primary side current $I_p$ increase linearly, and the secondary side switch transistor SR is turned off. At moment t0, the primary side current $I_p$ reaches the preset value and the primary switch L_S is turned off.

As shown in FIG. 7, when $V_{in}$<n*$V_o$, after the primary side switch L_S is turned off, the clamp switch H_S is turned on during the demagnetization stage of the transformer (t0~t4). At this time, the magnetic inductance $L_m$ of the transformer is clamped to n*$V_o$ by the secondary side circuit, and the leakage inductance $L_k$ resonates with the clamp capacitor $C_C$ to transfer the energy of the clamp capacitor $C_C$ to the secondary side circuit. The clamp switch H_S is turned off when the resonant current reaches 0 to reduce oscillation of the leakage inductance and hard turn-off loss.

The operating waveform of the active clamp flyback converter when the input voltage is a low voltage and $V_{in}$>n*$V_o$ is illustrated below in conjunction with FIGS. 2-4 and FIG. 8.

First stage t0~t1: at the moment to, the primary switch L_S is turned off, a primary side current $I_p$ charges an output capacitor (i.e., the junction capacitance) of the primary side switch L_S, and an output capacitor (i.e., the junction capacitance) of the clamp switch H_S is discharged. When the voltage $V_{DS}$ across the drain and source of the primary side switch L_S rises to the input voltage $V_{in}$ plus a voltage of the clamp capacitor $C_C$, the clamp switch H_S is turned on, $V_{DS}$ is clamped, the leakage inductance $L_k$ charges the clamp capacitor $C_C$, and the energy of the leakage inductance $L_k$ is stored in the clamp capacitor $C_C$. The primary side current $I_p$ drops rapidly. At the moment t1, the primary side current $I_p$ drops to 0, and a secondary side current $I_s$ reaches a maximum value.

Second stage t1-t2: From the moment t1, the secondary side current $I_s$ begins to decrease and transmits energy to a load at the output terminal. At the moment t2 in the demagnetization stage, the clamp switch H_S is turned on.

Third stage t2~t3: At the moment t2, the clamp switch H_S is turned on, the voltage across the primary side magnetizing inductor $L_m$ is clamped by an output of the secondary side circuit, the clamp capacitor $C_C$ and the leakage inductance $L_k$ of the transformer start to resonate, and the energy of the clamp capacitor $C_C$ begins to be transferred to the secondary side circuit. After half a resonant cycle, the resonant current reaches 0 A at the moment t3, at which time the clamp switch H_S is controlled to be turned off. At this time, the recovery of the energy of the leakage inductance $L_k$ is realized, the turn-off loss is small at this time, and the leakage inductance $L_k$ will not generate oscillation, thereby reducing the leakage inductance loss. It should be noted that the clamp switch H_S may be turned on at any time during the demagnetization stage.

Fourth stage t3~t4: At this time, the secondary side winding continues to demagnetize until the secondary side current $I_s$ drops to 0 at moment t4.

Fifth stage t4~t5: From the moment t4, the primary side magnetic inductance $L_m$ starts to resonate with the junction capacitances of the primary side switch L_S, the clamp switch H_S and the secondary side switch transistor SR. $V_{DS}$ starts to oscillate from $V_{in}$+n*$V_o$, and the amplitude of the oscillation is n*$V_o$. Since in this embodiment $V_{in}$>n*$V_o$, at the moment t5, $V_{DS}$ oscillates to the bottom but cannot oscillate to 0V. At this time, the primary side switch L_S is turned on. Here, the hard turn-on voltage of the primary side switch L_S is $V_{in}$−n*$V_o$. Since $V_{in}$ is relatively small, the loss is relatively small.

Sixth stage t5~t6 (t0): At the moment t5, the primary switch L_S is turned on, the voltage at the primary side of the transformer is $V_{in}$, the exciting current $I_m$ of the transformer and the primary side current $I_p$ increase linearly, and the secondary side switch transistor SR is turned off. At the moment t6, the primary side current $I_p$ reaches the preset value and the primary switch L_S is turned off.

As shown in FIG. 8, when the input voltage is a low voltage and $V_{in}$>n*$V_o$, although $V_{DS}$ is unable to completely oscillate to 0, the input voltage $V_{in}$ is a low voltage and the loss of hard switch is relatively small. Therefore, the clamp switch H_S may be turned on during the demagnetization stage of the transformer (t0~t4) to release the energy of the clamp capacitor $C_C$, thereby reducing the additional negative exciting current, core loss and conduction loss.

Figure 10:
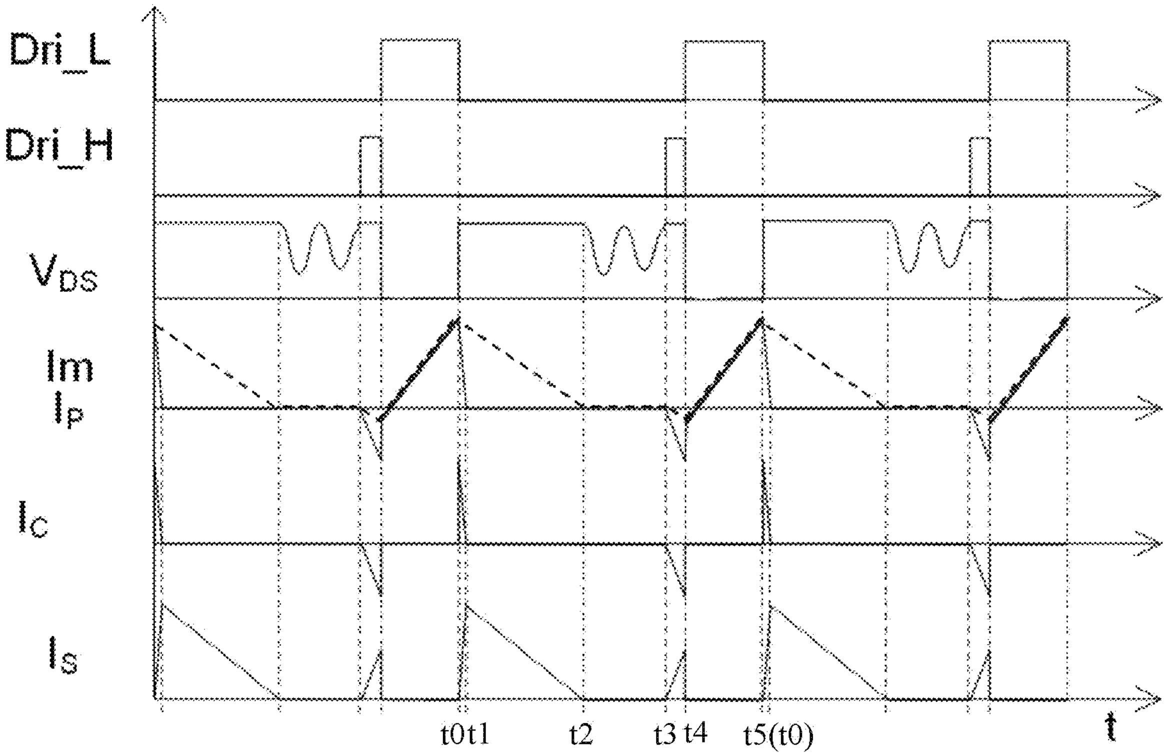
FIG. 10 shows an operating waveform of still another active clamp flyback converter in an embodiment of the present disclosure.

In some embodiments, the active clamp flyback converter further includes a secondary side circuit, and the secondary side circuit is electrically connected to the secondary side winding. When the input voltage $V_{in}$ of the active clamp flyback converter is greater than or equal to the preset voltage threshold, and the input voltage $V_{in}$ of the active clamp flyback converter is greater than the product of the output voltage $V_o$ of the active clamp flyback converter and the turns ratio of the transformer, that is, when the input voltage $V_{in}$ is a high voltage and $V_{in}>n*V_o$, the following steps may be performed: in a same switching cycle, controlling the clamp switch H_S to turn on after an end of a freewheeling stage of the secondary side circuit (after the moment t4 as shown in FIG. 9, after the moment t2 as shown in FIG. 10); and controlling the clamp switch H_S to turn off before the primary side switch L_S is turned on (before the moment t6 as shown in FIG. 9, before the moment t4 as shown in FIG. 10). In the embodiment shown in FIG. 10, after the freewheeling stage ends, the clamp switch H_S is turned on for a specific time at the peak of the oscillation (at the moment t3 as shown in FIG. 10) to feed back the clamp energy while generating a negative exciting current to achieve ZVS. In this embodiment, the clamp switch H_S is only turned on once in the same switching cycle. For details on the specific period, reference is made to the description of the operating waveform diagram of the active clamp flyback converter below.

In some embodiments, as shown in FIG. 9, when the input voltage $V_{in}$ of the active clamp flyback converter is greater than or equal to the preset voltage threshold, and the input voltage $V_{in}$ of the active clamp flyback converter is greater than the product of the output voltage $V_o$ of the active clamp flyback converter and the turns ratio of the transformer, that is, when the input voltage $V_{in}$ is a high voltage and $V_{in}>n*V_o$, the following steps may be performed: controlling the clamp switch H_S to turn on after an end of a freewheeling stage of the secondary side circuit (after the moment t4 as shown in FIG. 9); and controlling the clamp switch H_S to turn off before the primary side switch L_S is turned on (before the moment t6 as shown in FIG. 9). In this embodiment, after the freewheeling stage ends, the clamp switch H_S is turned on for a specific time at the peak of the oscillation (the moment t5 as shown in FIG. 9) to feed back the clamp energy while generating a negative exciting current to achieve ZVS. In addition, following steps are performed: in the same switching cycle, controlling the clamp switch H_S to turn on when the transformer is in the demagnetization stage (t0~t4 as shown in FIG. 9); and controlling the clamp switch H_S to turn off when the resonant current of the clamp capacitor and the leakage inductance of the transformer reaches the preset current threshold (the moment t3 as shown in FIG. 9). In this embodiment, the clamp switch H_S will be turned on twice in the same switching cycle. For details on the two specific periods, reference is made to the description of the operating waveform diagram of the active clamp flyback converter below.

In the above embodiments as shown in FIG. 9 and FIG. 10, the clamp switch H_S is controlled to be turned on after the end of the freewheeling stage of the secondary side circuit, and specifically, the clamp switch H_S may be controlled to be turned on when a voltage across the primary side switch L_S oscillates to a peak value after the end of the freewheeling stage of the secondary side circuit. The freewheeling stage is, for example, t0 to t4 in FIG. 9, and t0 to t2 in FIG. 10. For details on the specific turn-on period of the clamp switch H_S, reference is made to the description of the operating waveform diagram of the active clamp flyback converter below.

In some embodiments, controlling the clamp switch H_S to turn off before the primary side switch L_S is turned on, includes: determining a conduction duration according to the input voltage $V_{in}$ of the active clamp flyback converter, the output voltage of the active clamp flyback converter, an equivalent capacitance of the primary side switch L_S, and a magnetic inductance of the transformer; and controlling the clamp switch H_S to turn off when a turn-on duration of the clamp switch H_S reaches the conduction duration before the primary side switch L_S is turned on.

In some embodiments, the value of the conduction duration is positively correlated with the input voltage of the active clamp flyback converter, the value of the conduction duration is negatively correlated with the output voltage of the active clamp flyback converter, the value of the conduction duration is positively correlated with the equivalent capacitance of the primary side switch, and the value of the conduction duration is positively correlated with the magnetic inductance of the transformer.

In some embodiments, the conduction duration may be determined by the following formula:

$$t_{on\_H} = \sqrt{L_m C_{eq}} * \sqrt{\frac{V_{in}^2 - (nV_0)^2}{(nV_0)^2}} \tag{1}$$

$t_{on\_H}$ represents the conduction duration, $V_{in}$ represents the input voltage of the active clamp flyback converter, $V_o$ represents the output voltage of the active clamp flyback converter, $C_{eq}$ represents the equivalent capacitance of the primary side switch, $L_m$ represents the magnetic inductance of the transformer, n represents the turns ratio of the transformer.

Specifically, in some embodiments, determining whether the secondary circuit is in the freewheeling stage according to the current $I_s$ flowing through the secondary side circuit may be that the secondary circuit is in the freewheeling stage when the primary side switch L_S is in the off state and the current $I_s$ flowing through the secondary side winding is a positive current (t0~t4 as shown in FIG. 9, and t0~t2 as shown in FIG. 10), where it is defined that the current $I_m$ is a positive current when it flows from a lower end C to an upper end D of the secondary side winding. For details on the specific period of the demagnetization stage, reference is made to the description of the operating waveform diagram of the active clamp flyback converter below.

In the embodiments of the present disclosure, when the input voltage $V_{in}$ of the active clamp flyback converter is a high voltage and $V_{in}>n*V_o$, the frequency reduction is controlled by controlling the duration from the end of the freewheeling stage to the conduction of the clamp switch H_S, thereby optimizing the efficiency of high-voltage inputs and light loads.

A first operating waveform of the active clamp flyback converter when the input voltage $V_{in}$ is a high voltage and $V_{in}>n*V_o$ is illustrated below in conjunction with FIG. 2-FIG. 4 and FIG. 10.

First stage t0~t1: At the moment to, the primary switch L_S is turned off, a primary side current $I_p$ charges an output capacitor (i.e., the junction capacitance) of the primary side switch L_S, and an output capacitor (i.e., the junction capacitance) of the clamp switch H_S is discharged. The voltage $V_{DS}$ across the drain and source of the primary side switch L_S rises to the input voltage $V_{in}$ plus a voltage of the clamp capacitor $C_C$. The primary side current $I_p$ drops rapidly. At the moment t1, the primary side current $I_p$ drops to 0, and a secondary side current $I_s$ reaches a maximum value.

Second stage t1-t2: From the moment t1, the secondary side current $I_s$ begins to decrease and transmits energy to a load at the output terminal, until the secondary side current $I_s$ drops to 0 at the moment t2.

Third stage t2~t3: From the moment t2, the primary side magnetic inductance $L_m$ starts to resonate with the junction capacitances of the primary side switch L_S, the clamp switch H_S and the secondary side switch SR. $V_{DS}$ starts to oscillate from $V_{in}$+n*$V_o$, and the amplitude of the oscillation is n*$V_o$. After a set time, $V_{DS}$ oscillates to the peak value at the moment t3, at which time the clamp switch H_S is turned on.

Fourth stage t3~t4: At the moment t3, the clamp switch H_S is turned on, and a negative exciting current is generated. After a preset time, the clamp switch H_S is turned off at the moment t4, which helps the primary switch L_S achieve ZVS and reduces the turn-on loss.

Fifth stage t4~t5 (t0): At the moment t4, the primary switch L_S is turned on in a ZVS manner, the voltage at the primary side of the transformer is $V_{in}$, the exciting current $I_m$ of the transformer and the primary side current $I_p$ increase linearly, and the secondary side switch transistor SR is turned off. At the moment t5 (t0), the primary side current $I_p$ reaches the preset value and the primary switch L_S is turned off.

As shown in FIG. 9, when the input voltage $V_{in}$ is a high voltage and $V_{in}$>n*$V_o$, the clamp switch H_S is turned on once after the end of the freewheeling stage, and a negative exciting current is generated to achieve the ZVS of the primary switch L_S, which can reduce the current that turns on the clamp switch H_S, and reduce the turn-off loss of the clamp switch H_S and oscillation loss of the leakage inductance.

A second operating waveform of the active clamp flyback converter when the input voltage $V_{in}$ is a high voltage and $V_{in}$>n*$V_o$ is illustrated below in conjunction with FIG. 2-FIG. 4 and FIG. 9.

First stage t0~t1: at the moment to, the primary switch L_S is turned off, a primary side current $I_p$ charges an output capacitor (i.e., the junction capacitance) of the primary side switch L_S, and an output capacitor (i.e., the junction capacitance) of the clamp switch H_S is discharged. When the voltage $V_{DS}$ across the drain and source of the primary side switch L_S rises to the input voltage $V_{in}$ plus a voltage of the clamp capacitor $C_C$, the clamp switch H_S is turned on, $V_{DS}$ is clamped, the leakage inductance $L_k$ charges the clamp capacitor $C_C$, and the energy of the leakage inductance $L_k$ is stored in the clamp capacitor $C_C$. The primary side current $I_p$ drops rapidly. At the moment t1, the primary side current $I_p$ drops to 0, and a secondary side current $I_s$ reaches a maximum value.

Second stage t1-t2: From the moment t1, the secondary side current $I_s$ begins to decrease and energy is transmitted to a load at the output terminal. At the moment t2 in the demagnetization stage, the clamp switch H_S is turned on.

Third stage t2~t3: At the moment t2, the clamp switch H_S is turned on, the voltage across the primary side magnetizing inductor $L_m$ is clamped by an output of the secondary side circuit, the clamp capacitor $C_C$ and the leakage inductance $L_k$ of the transformer start to resonate, and the energy of the clamp capacitor $C_C$ begins to be transferred to the secondary side circuit. After half a resonant cycle, the resonant current reaches 0 A at the moment t3, at which time the clamp switch H_S is controlled to be turned off. At this time, the recovery of the energy of the leakage inductance $L_k$ is realized, the turn-off loss is small at this time, and the leakage inductance $L_k$ will not generate oscillation, thereby reducing the leakage inductance loss.

Fourth stage t3~t4: At this time, the secondary side winding continues to demagnetize until the secondary side current $I_s$ drops to 0 at moment t4.

Fifth stage t4~15: From the moment t4, the primary side magnetic inductance $L_m$ starts to resonate with the junction capacitances of the primary side switch L_S, the clamp switch H_S and the secondary side switch transistor SR. $V_{DS}$ starts to oscillate from $V_{in}$+n*$V_o$, and the amplitude of the oscillation is n*$V_o$. After a set time, $V_{DS}$ oscillates to the peak value at the moment t5, at which moment the clamp switch H_S is turned on again.

Sixth stage t5~t6: At the moment t5, the clamp switch H_S is turned on, and a negative exciting current is generated. After a preset time, the clamp switch H_S is turned off at the moment t6, which helps the primary switch L_S achieve ZVS and reduce the turn-on loss. The clamp switch H_S has already been turned on once in the freewheeling stage to release the energy of the clamp capacitor. The current after the clamp switch H_S is turned on after the end of the freewheeling stage is greatly reduced, which helps to reduce the turn-off loss of the clamp switch H_S and oscillation loss of the leakage inductance.

Seventh stage t6~t7 (t0): At the moment t6, the primary switch L_S is turned on in a ZVS manner, the voltage at the primary side of the transformer is $V_{in}$, the exciting current $I_m$ of the transformer and the primary side current $I_p$ increase linearly, and the secondary side switch transistor SR is turned off. At the moment t7 (*t*), the primary side current $I_p$ reaches the preset value and the primary switch L_S is turned off.

As shown in FIG. 9, when the input voltage $V_{in}$ is a high voltage and $V_{in}$>n*$V_o$, the clamp switch H_S is turned on once during the demagnetization stage to release the leakage inductance energy first, and is turned off when the resonant current is close to 0 A. The clamp switch H_S is turned on again after the end of the freewheeling stage, and the ZVS of the primary side switch L_S is achieved by a reverse excitation, which can reduce the current when the clamp switch H_S is turned on for the second time, and reduce the turn-off loss of the clamp switch H_S as well as oscillation loss of the leakage inductance.

In the control method for the active clamp flyback converter provided by the embodiments of the present disclosure, when the input voltage is a low voltage, or $V_{in}$<n*$V_o$, the clamp switch H_S is turned on during the demagnetization stage of the transformer, and the clamp switch H_S is turned off when the resonant current of the clamp capacitor $C_c$ and the leakage inductance approaches 0 A, which can reduce the core loss caused by the negative exciting current and the rectification loss of the secondary side switch. In addition, the clamp switch H_S is turned off when the resonant current of the clamp capacitor $C_c$ and the leakage inductance is close to 0 A, so that the turn-off loss of the clamp switch H_S and the oscillation loss of the leakage inductance can be reduced. In the case where the leakage inductance is relatively large, the efficiency enhancement is more obvious. When the input voltage is high and $V_{in}$>n*$V_o$, the clamp switch H_S is turned on after the freewheeling stage and operates in the non-complementary discontinuous mode, which effectively lowers the frequency, reduces the switching losses, and improves the average efficiency.

Figure 11:
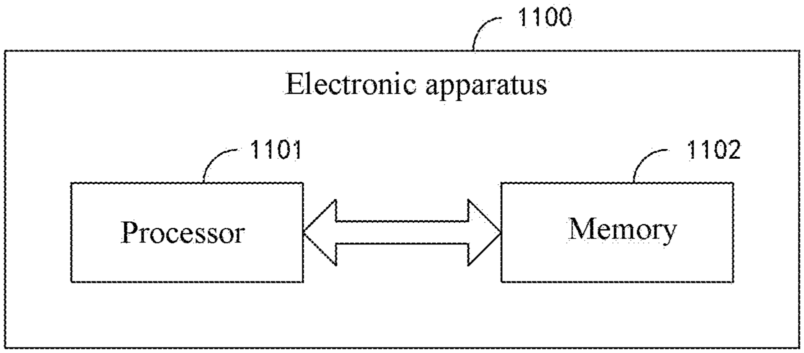
FIG. 11 shows a structural block diagram of an electronic apparatus in an embodiment of the present disclosure.

As shown in FIG. 11, an embodiment of the present disclosure further provides an electronic apparatus 1100, including a processor 1101, a memory 1102, and a program or instructions stored on the memory 1102 and runnable on the processor 1101. When the program or instructions are executed by the processor 1101, the above-mentioned various processes of the above embodiments of the control method for active clamp flyback converter are implemented, and the same technical effects can be achieved, which will not be described herein to avoid repetition.

Other embodiments of the present disclosure will be readily apparent to those skilled in the art upon consideration of the specification and practice of the present disclosure disclosed herein.

The present disclosure is intended to cover any variations, uses, or adaptations of the present disclosure that follow the general principles of the present disclosure and include common knowledge or customary technical means in the technical field that are not disclosed in the present disclosure. The specification and embodiments are considered as exemplary only, and the true scope and spirit of the present disclosure are indicated by the appended claims.

What is claimed is:

1. A control method for an active clamp flyback converter, wherein the active clamp flyback converter comprises:

a transformer, comprising a primary side winding and a secondary side winding coupled with each other;

a primary side switch, connected in series to the primary side winding;

a clamp branch circuit, connected in parallel to the primary side winding or in parallel to the primary side switch; wherein the clamp branch circuit comprises a clamp switch and a clamp capacitor connected in series;

wherein the control method comprises:

in response to that an input voltage of the active clamp flyback converter is less than a preset voltage threshold, or the input voltage of the active clamp flyback converter is less than a product of an output voltage of the active clamp flyback converter and a turns ratio of the transformer, performing following steps:

in a same switching cycle, controlling the clamp switch to turn on when the transformer is in a demagnetization stage; and controlling the clamp switch to turn off when a resonant current of the clamp capacitor and a leakage inductance of the transformer reaches a preset current threshold.

2. The control method according to claim 1, wherein the active clamp flyback converter further comprises a secondary side circuit, the secondary side circuit is electrically connected to the secondary side winding, wherein the control method comprises: in response to that the input voltage of the active clamp flyback converter is greater than or equal to the preset voltage threshold, and the input voltage of the active clamp flyback converter is greater than the product of the output voltage of the active clamp flyback converter and the turns ratio of the transformer, performing following steps:

in a same switching cycle, controlling the clamp switch to turn on after an end of a freewheeling stage of the secondary side circuit; and, controlling the clamp switch to turn off before the primary side switch is turned on.

3. The control method according to claim 2, wherein the control method further comprises:

in response to that the input voltage of the active clamp flyback converter is greater than or equal to the preset voltage threshold, and the input voltage of the active clamp flyback converter is greater than the product of the output voltage of the active clamp flyback converter and the turns ratio of the transformer, performing following steps:

in a same switching cycle, controlling the clamp switch to turn on when the transformer is in the demagnetization stage; and controlling the clamp switch to turn off when the resonant current of the clamp capacitor and the leakage inductance of the transformer reaches the preset current threshold.

4. The control method according to claim 3, wherein controlling the clamp switch to turn on after the end of the freewheeling stage of the secondary side circuit, comprises:

controlling the clamp switch to turn on when a voltage across the primary side switch oscillates to a peak value after the end of the freewheeling stage of the secondary side circuit.

5. The control method according to claim 3, wherein controlling the clamp switch to turn off before the primary side switch is turned on, comprises:

determining a conduction duration according to the input voltage of the active clamp flyback converter, the output voltage of the active clamp flyback converter, an equivalent capacitance of the primary side switch, and a magnetic inductance of the transformer; and controlling the clamp switch to turn off when a turn-on duration of the clamp switch reaches the conduction duration before the primary side switch is turned on.

6. The control method according to claim 3, wherein controlling the clamp switch to turn on after the end of the freewheeling stage of the secondary side circuit comprises: when the primary side switch is turned off and a current flowing through the secondary side winding is a positive current, the secondary side circuit is in the freewheeling stage.

7. The control method according to claim 3, wherein the control method further comprises:

determining whether the transformer is in the demagnetization stage according to a current flowing through a magnetic inductance of the primary side winding.

8. The control method according to claim 7, wherein determining whether the transformer is in the demagnetization stage according to the current flowing through the magnetic inductance of the primary side winding, comprises:

the transformer being in the demagnetization stage when the current flowing through the magnetic inductance of the primary side winding is a positive current and presents a downward trend.

9. The control method according to claim 3, wherein the preset current threshold is 0 A.

10. The control method according to claim 2, wherein controlling the clamp switch to turn on after the end of the freewheeling stage of the secondary side circuit, comprises:

controlling the clamp switch to turn on when a voltage across the primary side switch oscillates to a peak value after the end of the freewheeling stage of the secondary side circuit.

11. The control method according to claim 2, wherein controlling the clamp switch to turn off before the primary side switch is turned on, comprises:

determining a conduction duration according to the input voltage of the active clamp flyback converter, the output voltage of the active clamp flyback converter, an equivalent capacitance of the primary side switch, and a magnetic inductance of the transformer; and controlling the clamp switch to turn off when a turn-on duration of the clamp switch reaches the conduction duration before the primary side switch is turned on.

12. The control method according to claim 2, wherein controlling the clamp switch to turn on after the end of the freewheeling stage of the secondary side circuit comprises:

when the primary side switch is turned off and a current flowing through the secondary side winding is a positive current, the secondary side circuit is in the freewheeling stage.

13. The control method according to claim 1, wherein the control method further comprises:

determining whether the transformer is in the demagnetization stage according to a current flowing through a magnetic inductance of the primary side winding.

14. The control method according to claim 13, wherein determining whether the transformer is in the demagnetization stage according to the current flowing through the magnetic inductance of the primary side winding, comprises:

the transformer being in the demagnetization stage when the current flowing through the magnetic inductance of the primary side winding is a positive current and presents a downward trend.

15. The control method according to claim 1, wherein in response to that the input voltage of the active clamp flyback converter is less than the preset voltage threshold, or the input voltage of the active clamp flyback converter is less than the product of the output voltage of the active clamp flyback converter and the turns ratio of the transformer, the active clamp flyback converter operates in a single pulse non-complementary mode.

16. The control method according to claim 1, wherein the preset current threshold is 0 A.

17. The control method according to claim 1, wherein in response to that the input voltage of the active clamp flyback converter is less than the product of the output voltage of the active clamp flyback converter and the turns ratio of the transformer, a voltage across the primary side switch oscillates to 0V; in response to that the input voltage of the active clamp flyback converter is greater than or equal to the product of the output voltage of the active clamp flyback converter and the turns ratio of the transformer, the voltage across the primary side switch is unable to oscillate to 0V.

18. The control method according to claim 1, wherein the active clamp flyback converter further comprises a secondary side circuit, and the secondary side circuit comprises an output capacitor;

wherein the control method further comprises:

in a stage where the primary side switch is turned off and the clamp switch is turned on, the clamp capacitor transmitting energy to at least one of the output capacitor or an output load via the clamp switch.

19. An active clamp flyback converter, comprising:

a transformer, comprising a primary side winding and a secondary side winding coupled with each other;

a primary side switch, connected in series to the primary side winding;

a clamp branch circuit, connected in parallel to the primary side winding or in parallel to the primary side switch; wherein the clamp branch circuit comprises a clamp switch and a clamp capacitor connected in series;

a control unit, connected to the primary side switch and the clamp switch, wherein the control unit is configured to:

in response to that an input voltage of the active clamp flyback converter is less than a preset voltage threshold, or the input voltage of the active clamp flyback converter is less than a product of an output voltage of the active clamp flyback converter and a turns ratio of the transformer, in a same switching cycle, control the clamp switch to turn on when the transformer is in a demagnetization stage; and control the clamp switch to turn off when a resonant current of the clamp capacitor and a leakage inductance of the transformer reaches a preset current threshold.

20. The active clamp flyback converter according to claim 19, wherein the active clamp flyback converter further comprises a secondary side circuit, and the secondary side circuit comprises an output capacitor, wherein in a stage where the primary side switch is turned off and the clamp switch is turned on, the clamp capacitor transmits energy to at least one of the output capacitor or an output load via the clamp switch.

* * * * *